(12) United States Patent
Van De Beuken

(10) Patent No.: US 11,214,468 B2
(45) Date of Patent: Jan. 4, 2022

(54) SYSTEM AND METHOD FOR LOADING AND UNLOADING SHIPPING CONTAINERS

(71) Applicant: John Van De Beuken, Tucson, AZ (US)

(72) Inventor: John Van De Beuken, Tucson, AZ (US)

( * ) Notice: Subject to any disclaimer, the term of this patent is extended or adjusted under 35 U.S.C. 154(b) by 0 days.

(21) Appl. No.: 16/673,897

(22) Filed: Nov. 4, 2019

(65) Prior Publication Data

US 2020/0140243 A1    May 7, 2020

Related U.S. Application Data

(60) Provisional application No. 62/756,197, filed on Nov. 6, 2018.

(51) Int. Cl.
| | | |
|---|---|---|
| *B66C 19/00* | (2006.01) | |
| *B66C 9/04* | (2006.01) | |
| *B65G 63/00* | (2006.01) | |

(52) U.S. Cl.
CPC .............. *B66C 19/007* (2013.01); *B66C 9/04* (2013.01); *B66C 19/002* (2013.01); *B65G 63/004* (2013.01)

(58) Field of Classification Search
CPC ..... B66C 19/002; B66C 19/007; B66C 17/04; B66C 6/00; B66C 7/00; B66C 11/00; B66C 11/12; B66C 11/14; B65G 63/04; B65G 63/025
See application file for complete search history.

(56) References Cited

U.S. PATENT DOCUMENTS

| | | | | | |
|---|---|---|---|---|---|
| 749,860 | A | * | 1/1904 | Harding | B63B 27/22 414/138.9 |
| 1,674,967 | A | * | 6/1928 | Fitch | B66C 7/00 414/626 |
| 3,483,829 | A | * | 12/1969 | Barry | B61D 3/188 104/18 |
| 3,696,947 | A | * | 10/1972 | Ponsen | B66C 19/002 414/141.3 |
| 3,700,128 | A | * | 10/1972 | Noble | B65G 63/022 414/231 |
| 3,956,994 | A | * | 5/1976 | Barry | B61B 1/005 104/88.02 |
| 4,602,566 | A | * | 7/1986 | Kernkamp | B66C 19/002 104/91 |
| 4,750,429 | A | * | 6/1988 | Mordaunt | B66C 19/002 104/98 |
| 4,973,219 | A | * | 11/1990 | Brickner | B65G 63/004 104/88.05 |
| 6,588,611 | B1 | * | 7/2003 | Krueger-Beuster | B66C 19/002 104/98 |

(Continued)

*Primary Examiner* — Gregory W Adams
(74) *Attorney, Agent, or Firm* — Lewis Roca Rothgerber Christie LLP

(57) ABSTRACT

A crane system includes an elevated track spanning a first location to a second location; at least one spreader assembly configured to move along the elevated track using a tram assembly unit, and to move a shipping container from a first storage area to a second storage area, wherein the first storage area and the second storage area are between the first location and the second location; and a controller configured to identify the shipping container and control a movement of the shipping container using the at least one spreader assembly.

22 Claims, 6 Drawing Sheets

(56) References Cited

U.S. PATENT DOCUMENTS

| | | | | |
|---|---|---|---|---|
| 7,216,806 | B2* | 5/2007 | Kurita | G06Q 10/08 |
| | | | | 235/375 |
| 7,916,023 | B2* | 3/2011 | Rado | G01S 5/0294 |
| | | | | 340/572.1 |
| 7,961,911 | B2* | 6/2011 | Takehara | G06Q 10/087 |
| | | | | 382/104 |
| 8,206,074 | B2* | 6/2012 | Benedict | B66C 19/002 |
| | | | | 414/140.3 |
| 9,061,843 | B2* | 6/2015 | Torson | G06Q 10/087 |
| 2006/0220851 | A1* | 10/2006 | Wisherd | G06Q 10/08 |
| | | | | 340/568.1 |
| 2014/0255130 | A1* | 9/2014 | Pierangelino | B65G 63/004 |
| | | | | 414/141.3 |

* cited by examiner

SYSTEM AND METHOD FOR LOADING AND UNLOADING SHIPPING CONTAINERS

BACKGROUND

1. Field

Some embodiments of the present disclosure relate generally to control systems for cranes.

2. Description of the Related Art

The shipping industry has welcomed a number of higher capacity ships. For example, in the last few years, new container ships having capacities greater than 20,000 twenty-foot equivalent units (TEU) have been launched. These larger ships have greatly decreased operating costs per container when compared to smaller container ships. For example, a 20,000 TEU ship may provide a 50% operational cost savings with half the $CO_2$ emissions and fuel consumption of an average 14,000 TEU container ship. Unfortunately, port infrastructure has not kept pace with the development of increased ship sizes. In particular, the United States lacks the port infrastructure to handle these 20,000+ TEU container ships.

With the increased size of container ships, the unloading and loading process has become increasingly burdensome. Ships tend to be loaded without thought given to the unloading process. Ships are generally unloaded into a shipyard where the containers are stored until they can be loaded onto waiting trucks or trains. Unloading the ships often requires lots of room to temporarily store the various containers. Each port usually has surge capacity for the temporary storage of containers that have been unloaded. The surge capacity is often on par with the total capacity of a ship being unloaded. Thus, conventional ports will need to further scale their size to accommodate larger ships.

The above information is only for enhancement of understanding of the background of embodiments of the present disclosure, and therefore may contain information that does not form the prior art.

SUMMARY

Aspects of embodiments of the present disclosure are directed toward a system and method for a crane system.

According to some embodiments of the present disclosure, a crane system includes: an elevated track spanning a first location and elevated above a second location, at least one spreader configured to move along the elevated track using a tram assembly unit, and to move a shipping container from a first storage area to a second storage area, and a controller configured to identify the shipping container and automatically control a movement of the shipping container using at least one spreader.

According to some example embodiments, the elevated track includes an oval-shaped track.

According to some example embodiments, the first location corresponds to a ship and the second location corresponds to a container surge area.

According to some example embodiments, the first storage area includes a ship.

According to some example embodiments, the second storage area includes a train.

According to some example embodiments, the second storage area includes the container surge area.

According to some example embodiments, the controller is configured to identify the shipping container using at least one sensor and automatically place the shipping container on a train or in a container surge area.

According to some example embodiments, the at least one spreader assembly includes: a tram assembly unit including: a drive unit; at least one drive wheel; and at least one idler; a hoist unit; and a spreader.

According to some example embodiments, the tram assembly unit further includes two drive wheels and four idlers.

According to some example embodiments, the hoist unit further includes a hoist motor; a hoist cable; and a control cable.

According to some example embodiments, the system further includes a swivel configured to connect the tram assembly unit to the hoist unit.

According to some example embodiments of the present disclosure, the crane system includes: elevated track spanning a first location to a second location; at least one spreader assembly configured to move along the elevated track using a tram assembly unit, and to move a shipping container between a first storage area and a second storage area, wherein the first storage area and the second storage area are between the first location and the second location, wherein each of the at least one spreader assembly includes: a tram assembly unit including: a drive unit; at least one drive wheel; and at least one idler; a hoist unit; a swivel configured to connect the tram assembly unit to the hoist unit; a spreader connected to the hoist unit by at least one cable; and a controller configured to identify the shipping container and control a movement of the shipping container using the at least one spreader.

According to some example embodiments, the first storage area includes a ship.

According to some example embodiments, the second storage area includes a train.

According to some example embodiments, the second storage area includes a container surge area.

According to some example embodiments, the at least one drive wheel is in contact with a bottom of an I-beam of the track.

According to some example embodiments, the idlers are in contact with the center of the I-beam of the track.

According to some example embodiments of the present disclosure, in a method for loading and unloading a shipping container in a crane system, the method includes: identifying, by a controller, a location of the shipping container at a first storage area; retrieving, by the controller using a spreader assembly configured to travel along an elevated track, the shipping container at the first storage area; moving, by the controller using the spreader assembly, the shipping container from the first storage area to a second storage area; and storing, by the controller, the location of the shipping container at the second storage area.

According to some example embodiments, the elevated track includes an oval-shaped track.

According to some example embodiments, the first storage area includes a ship.

According to some example embodiments, the second storage area includes a train.

According to some example embodiments, the second storage area includes a container surge area.

BRIEF DESCRIPTION OF THE DRAWINGS

Some embodiments can be understood in more detail from the following description taken in conjunction with the accompanying drawings, in which.

DETAILED DESCRIPTION

Figure 1:
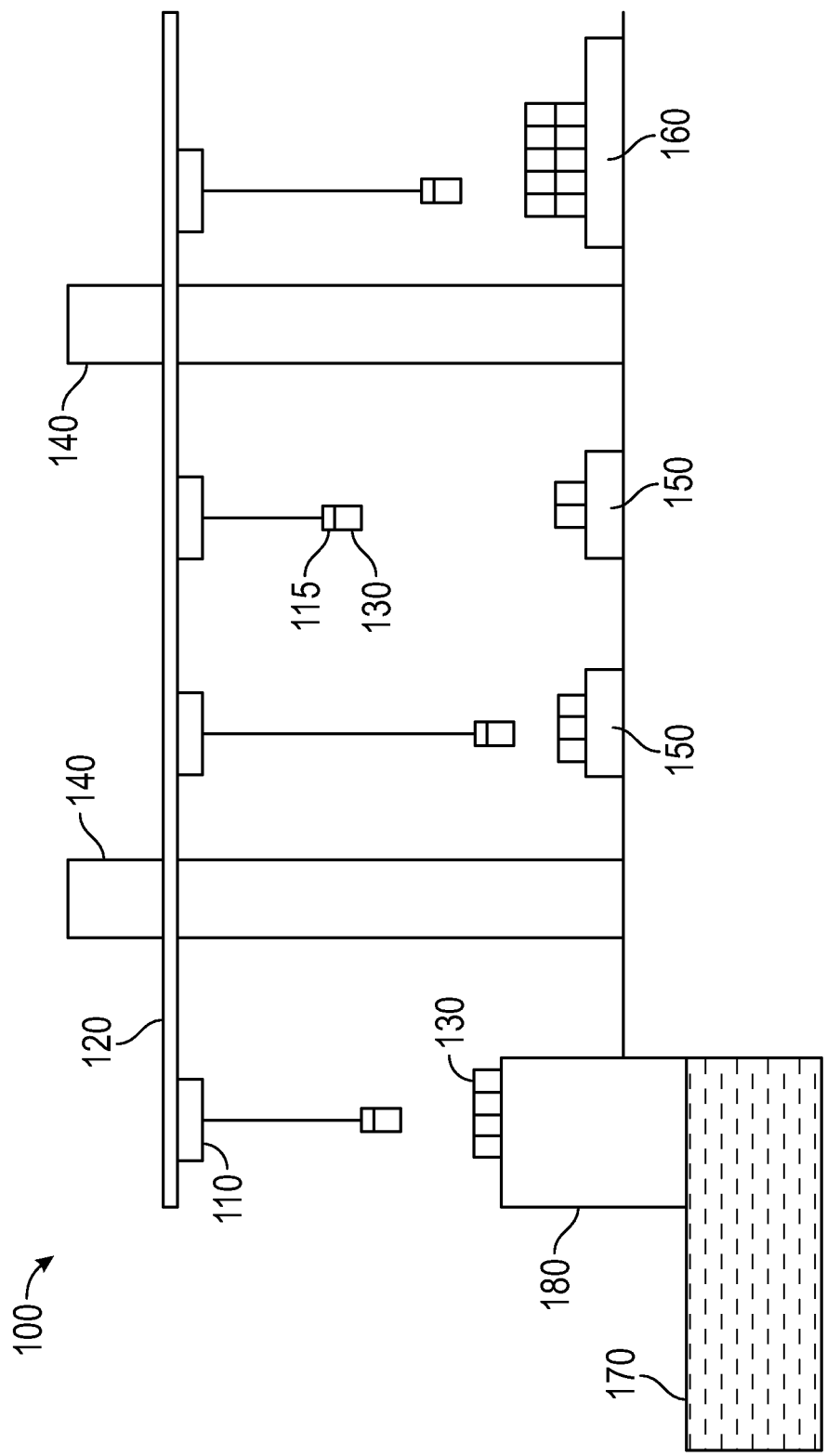
FIG. 1 depicts a cross-section view of a crane.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. The drawings are not necessarily to scale and the relative sizes of elements, layers, and regions shown may be exaggerated for clarity.

Embodiments of the present disclosure include a system and method for loading and unloading shipping containers. In particular, the system includes one or more cranes configured with spreaders designed to pick up and move shipping containers between large container ships and vehicles. For example, the crane may include one or more spreaders designed to securely hold and move various sizes of shipping containers. In various embodiments, the vehicles may include trains and the cranes may be configured to span a plurality of train tracks to facilitate the unloading and loading of containers on/from the trains. In various embodiments the cranes may also be configured to set the shipping containers in temporary holding areas such as a container surge area.

In various embodiments, a crane control system is configured to automatically identify containers to move and autonomously pick up the container from a ship and place it on an appropriate train. For example, in various embodiments, the loading and the unloading of a ship may be completely automated. The crane control system may log the locations of each shipping container when the container is loaded onto the ship. Then during unloading, the control system may plan and execute the unloading according to the trains located at the port based on the destination of the train. For example, the control system may be configured to unload the train to substantially minimize the use of a container surge area.

In various embodiments, the crane may be configured to span one or more rail lines. For example, in various embodiments, the crane may include a plurality of legs. In some embodiments, the legs may be configured to operate on rails similar to traditional train rails and are of a height to facilitate the loading and unloading of a container ship. In some embodiments, the legs operation on the rails allows for efficiently moving to different locations. A structure may connect the legs and span the one or more rail lines between the legs.

FIG. 1 depicts a cross-section view of a crane.

Referring to FIG. 1, in various embodiments, the crane 100 may be configured to extend over a ship 180 stationed in water 170 and may be configured to load and unload containers 130. In some embodiments, the crane 100 can be situated above a plurality of railroad tracks that include a plurality of trains 150. For example, in some embodiments, the crane 100 may be configured to span 20 or more trains 150 at the same time. In some embodiments, the trains 150 can be positioned between the legs 140 of the crane 100. The trains 150 may be utilized to transport the containers 130 to and from the port. In various embodiments, the crane 100 may also span a surge area 160 where containers 130 that will not be placed on a train 150 can be temporarily stored. The crane 100 may include a plurality of spreader assemblies 110 operating on a track 120. In various embodiments, the spreader assemblies 110 may contain a spreader 115. The spreader assemblies 110 can be configured to securely lift, hold, and transport containers 130. In various embodiments, the crane 100 may have up to 20 spreader assemblies 110 and each controlled by the crane control system, however, the embodiments are not limited thereto and any suitable number of spreader assemblies 110 may be used. In various embodiments, the crane control system may control the spreader assemblies 110 automatically. For example, the control system may use location data for the various containers 130 and correlate the data with the trains 150 and the surge area 160. The control system may then automatically control the spreader assemblies 110 to unload the containers 130 to the appropriate train 150 or place the containers in the surge area 160.

Figure 2:
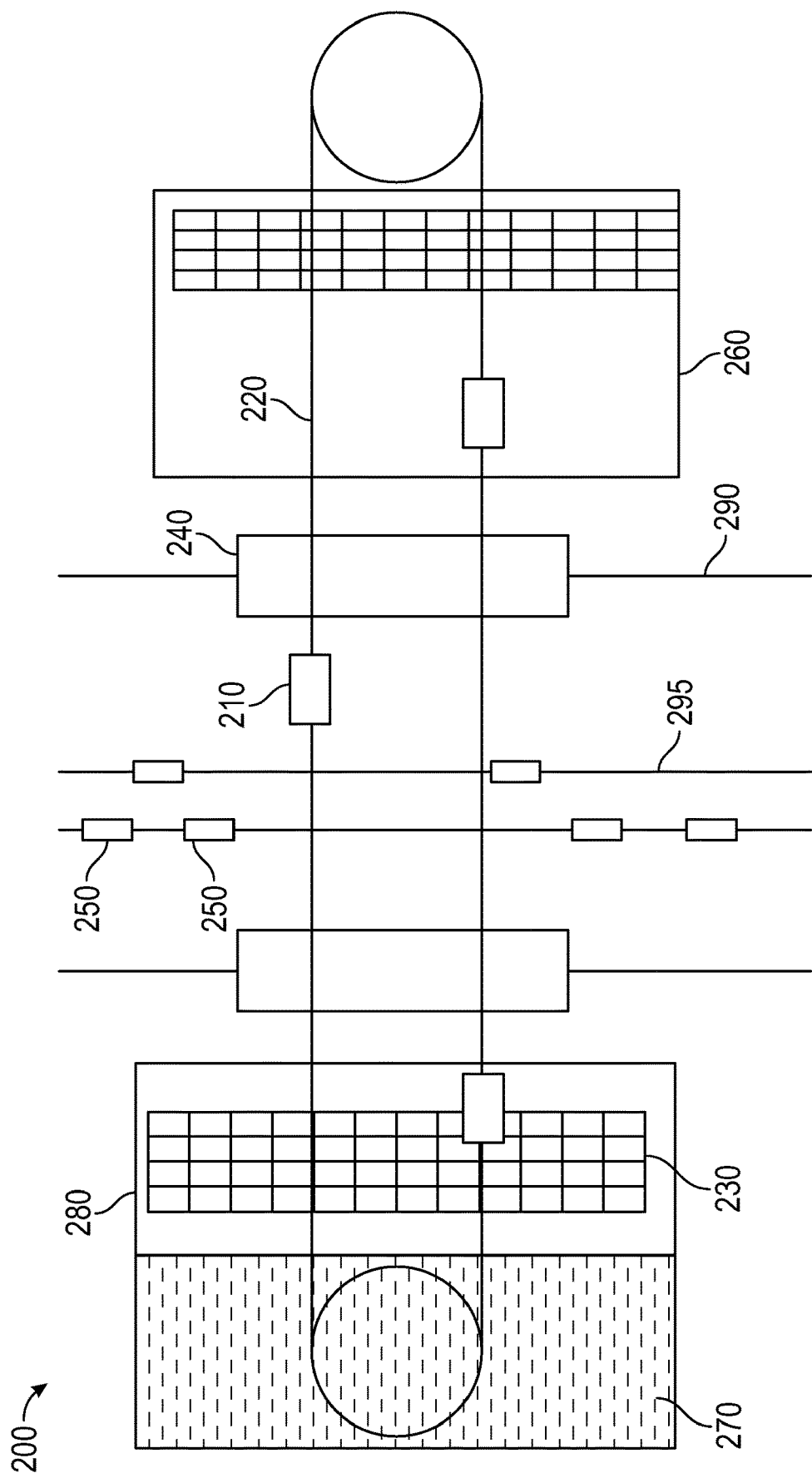
FIG. 2 depicts an aerial view of a crane.

FIG. 2 depicts an aerial view of a crane 200.

Referring to FIG. 2, in various embodiments, the crane 200 may be configured to extend over a ship 280 stationed in water 270 and may be configured to load and unload containers 230. In some embodiments, the crane 200 can be situated above a plurality of railroad tracks 295 that include a plurality of trains 250. For example, in some embodiments, the crane 200 may be configured to span 20 or more trains 250 at the same time. In some embodiments, the railroad tracks 295 can be positioned between the legs 240 of the crane 200. The trains 250 are configured to transport containers 230 to and from the port. In various embodiments, the legs 240 may be configured to operate on rails 290 similar to traditional train rails. This configuration allows the crane 200 to move to different locations along the rails 290. In various embodiments, the crane 200 also spans a surge area 260 where containers 230 that will not be placed on a train 250 can be stored (e.g., temporarily stored). The crane 200 may include a plurality of spreader assemblies 210 operating on a track 220. In various embodiments, the spreader assemblies 210 may contain a spreader. The spreader assemblies 210 can be configured to securely lift, hold, and transport containers 230. In various embodiments, the crane 200 may include any suitable number of spreader assemblies 210. For example, the crane 200 may include 20 or more spreader assemblies 210 and each spreader assembly 210 is controlled by the crane control system (e.g., the movement along the track 220 and the grabbing, lifting, holding, and transport of the containers 230). In various embodiments, the crane control system may control the spreader assemblies 210 automatically based on the locations of the each of the containers 230 on the ship 280, the available space on and destinations of the trains 250, and available space in the surge area 260.

Furthermore, in various embodiments, the crane 200 may have an oval-shaped track 220. Additionally, the spreader assemblies 210 may be configured to operate on the oval-shaped track 220. For example, the spreader assemblies 210 may operate using a tram assembly unit to travel along the oval-shaped track 220 to and from the space above the ship 280 to locations over the trains and the container surge area 260. For example, the spreader assemblies 210 may operate in a clockwise or counter clockwise direction. Because crane 200 may have multiple spreader assemblies 210, each spreader assembly 210 is capable of operating in a clockwise or counter clockwise direction. In various embodiments, the track 220 may be part of a high-speed hoist system. Each of the spreader assemblies 210 may travel independently along the track and are each controlled by the crane control system. The track 220 may be unidirectional (e.g., the spreaders may only travel in one direction) or bidirectional.

In various embodiments, the crane 200 may be configured to operate on two bays of containers on a ship. Thus, a series of five cranes 200 are able to operate on 10 bays of a 20,000 TEU ship's 22 container bays.

Figure 3:
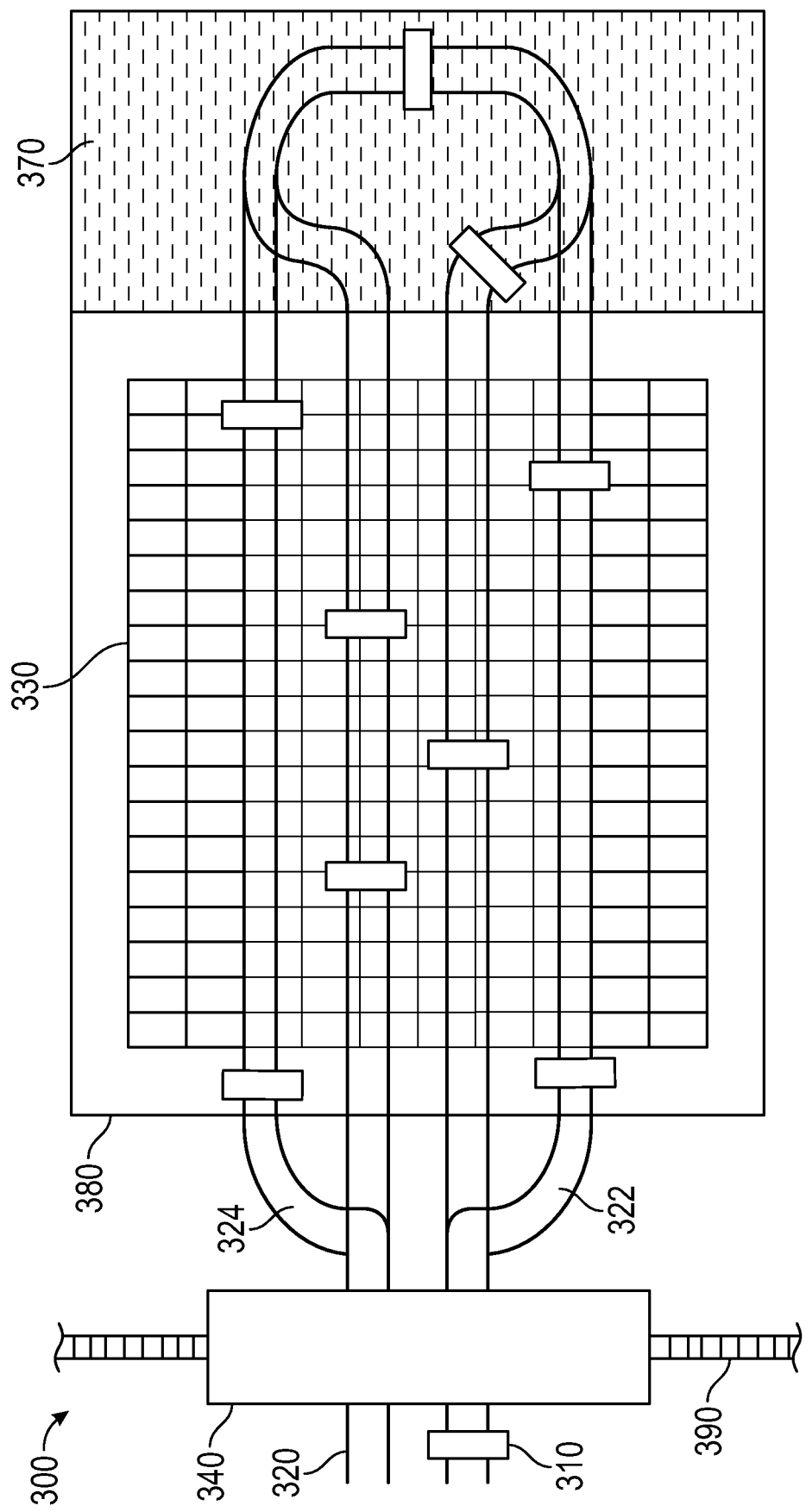
FIG. 3 depicts a partial aerial view of a crane.

FIG. 3 depicts a partial aerial view of a crane 300.

Referring to FIG. 3, in various embodiments, the crane 300 can be situated above a ship 380 stationed in water 370 and may be configured to load and unload containers 330. The containers 330 may be positioned in bays on the ship 380. For example, the ship 380 may include a plurality of forty foot bays or rows that span the width of the ship 380 and are arranged from the front to the back of the ship 380. In various embodiments, the legs 340 may be configured to operate on rails 390 similar to traditional train rails. In other embodiments, the legs 340 may be configured to operate on specialized rails for the transportation of the crane. The use of legs 340 on rails allows the crane 300 to move to different locations along the rails 390 to load/unload different areas of the ship 380. The crane 300 may include a plurality of spreader assemblies 310 operating on a track 320. In various embodiments, the spreader assemblies 310 may contain a spreader. The spreader assemblies 310 can be configured to securely lift, hold, and transport containers. In various embodiments, the crane 300 may have up to 20 spreader assemblies 310 and each controlled by the crane control system.

Furthermore, in various embodiments, the crane 300 may have an oval-shaped track 320. Additionally, the spreader assemblies 310 may be configured to operate on the oval-shaped track 320. For example, the spreader assemblies 310 may operate using a tram assembly unit to travel along the oval-shaped track 320 to and from the space above the ship 380 to locations over the trains and locations over the container surge area. For example, the spreader assemblies 310 may operate in a clockwise or counter clockwise direction. In various embodiments, the track 320 may be part of a high-speed hoist system. Each of the spreader assemblies 310 may travel independently along the track 320 and are each controlled by the crane control system. The track 320 may be unidirectional (e.g., the spreader assemblies 310 may only travel in one direction) or bidirectional.

In various embodiments, some of the bays may not be accessible using the oval-shaped track 320. In order to provide additional access to the inaccessible bays, the track 320 may be expanded to include additional tracks over the ship 380. For example, in various embodiments, the track 320 may include track switches 322, 324 that allow for a crane to have access to additional bays on the ship 380 using additional tracks. For example, outside of the leg 340, the track 320 may be expanded to include two additional tracks. Thus, the crane 300 may be capable of accessing four bays on the ship 380. Control of the track switches 322, 324 is handled by the controller, which identifies containers 330 to be unloaded, identifies the location of the desired containers 330, and controls the movement of the spreader assemblies 310 and the operation of the track switches 322, 324. In some embodiments, the track 320 may include more track switches to access more bays on the ship 380.

Figure 4:
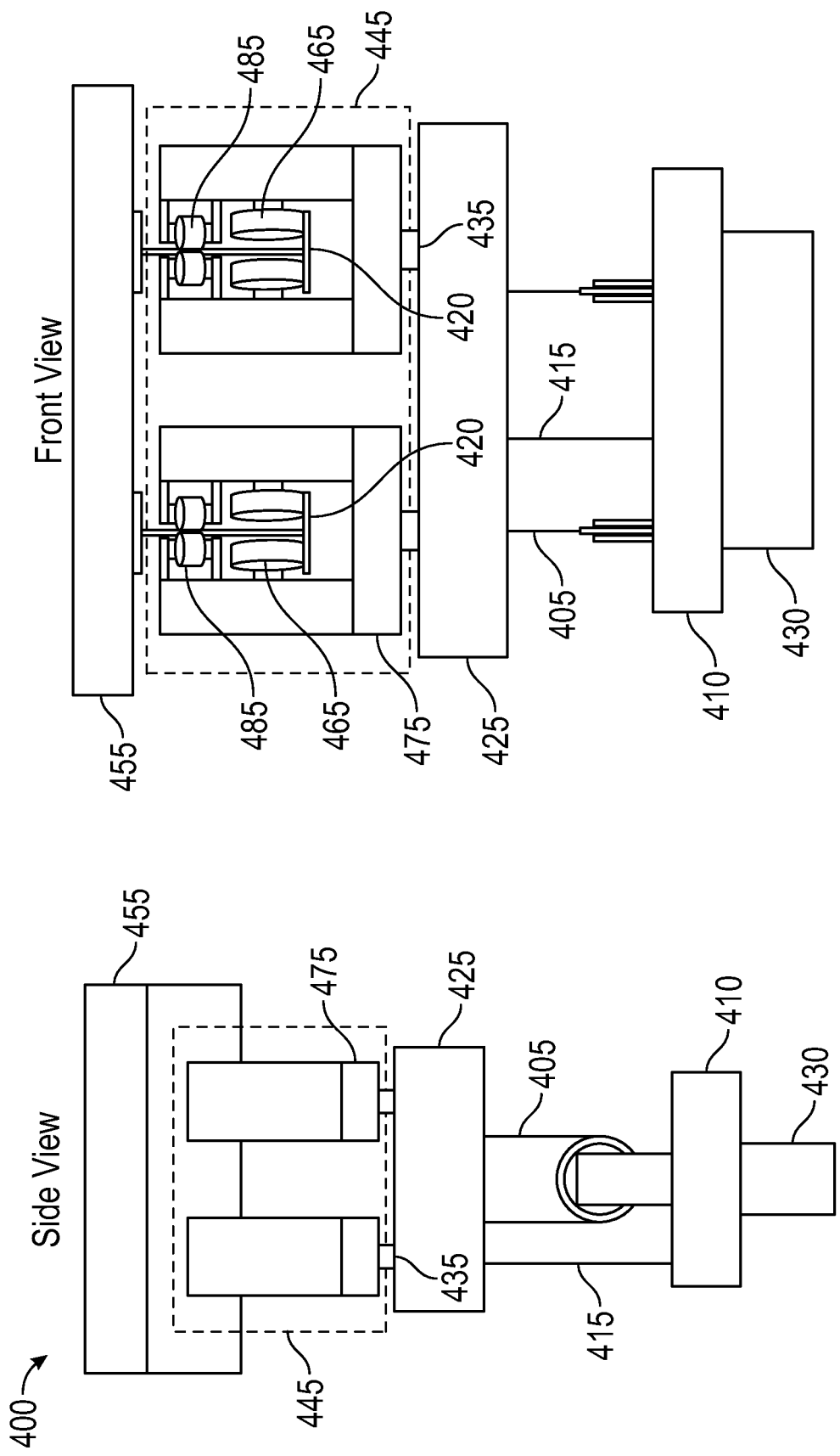
FIG. 4 depicts a front view and side view of a spreader assembly.

FIG. 4 depicts a front view and side view of a spreader assembly 400.

Referring to FIG. 4, in various embodiments, each spreader 410 may be connected to a hoist unit 425 by a hoist cable 405 and a control cable 415. The spreaders 410 can be configured to securely lift and transport containers 430. The hoist unit 425 is configured to raise and lower the spreader 410 using the hoist cable 405, the control cable 415, and a hoist motor located inside the hoist unit 425. The hoist unit 425 is attached to one or more tram assembly units 445 by a swiveling joint 435. The swiveling joint 435 is configured to facilitate the ability of the spreader 410 to pivot with the tram assembly unit 445 and the hoist unit 425 as they navigate the curves of the oval track. In various embodiments, four tram assembly units 445 suspend the hoist unit 425 on the track 420 and the crane track suspension system 455. In various embodiments, the track 420 can have an I-beam configuration. Each tram assembly unit 445 may include four drive wheels 465, a drive unit 475, and four idlers 485. In other embodiments, any suitable number of drive wheels 465 and idlers 485 may be utilized.

In some embodiments, the oval track 420 has an I-beam configuration. The drive wheels 465 rest on the bottom of the I-beam flange of the oval track 420 and are configured to generate the force that moves the spreader assembly 400 along the track 420. The idlers 485 may be positioned above the drive wheels 465 and can be used to steer each set of drive wheels 465 (i.e., to keep the drive wheels 465 on the track). The drive unit 475 is positioned below the drive wheels 465. In various embodiments, the drive unit 475 controls the drive wheels 465 that move the spreader assembly 400 along the oval track 420.

Figure 5:
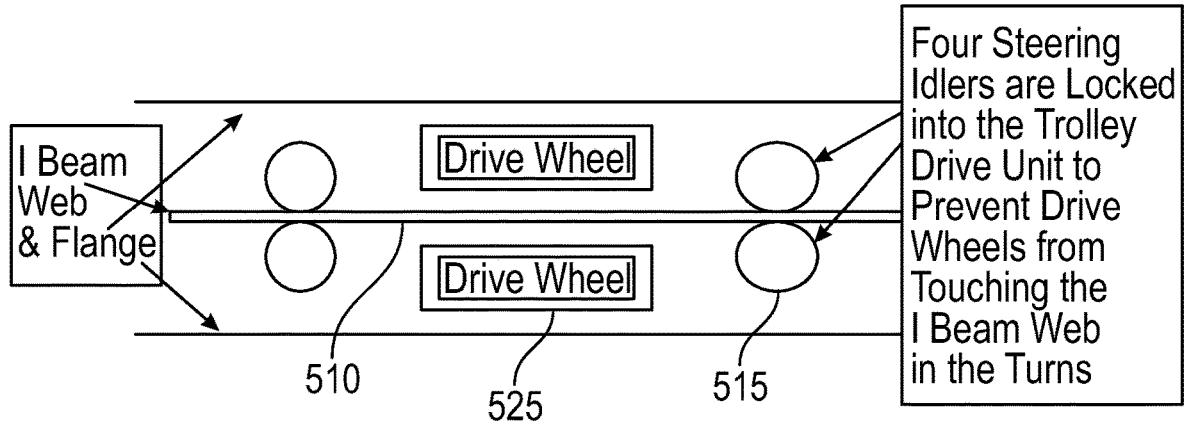
FIG. 5 depicts an alternative view of a tram steering system.

FIG. 5 depicts an alternative view of a tram steering system.

In various embodiments, each of the drive wheels 525 may be mechanically steered by idlers 515 mounted in front of and behind the drive wheels 525. The steering system allows each drive wheel 525 assembly to stay aligned with the I-beam of the oval track 510 even when the track 510 is curved. The idlers 515 may be configured to steer each set of drive wheels 525 continuously.

Figure 6:
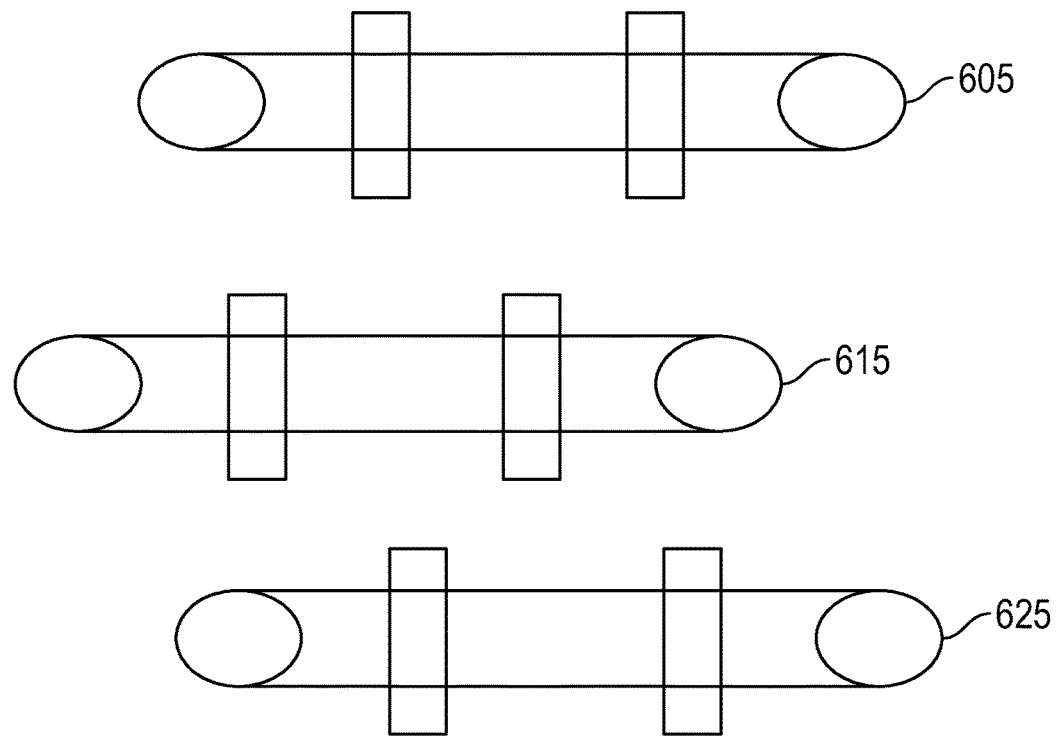
FIG. 6 depicts a plurality of cranes aligned on a dock.

FIG. 6 depicts a plurality of cranes aligned on a dock.

Referring to FIG. 6, in various embodiments, the cranes 605, 615, and 625 may be positioned adjacent to each other. In various embodiments, the crane legs may be configured to operate on rails similar to traditional train rails. This configuration allows each crane to move independently from each other to move to different locations along the rails.

Figure 7:
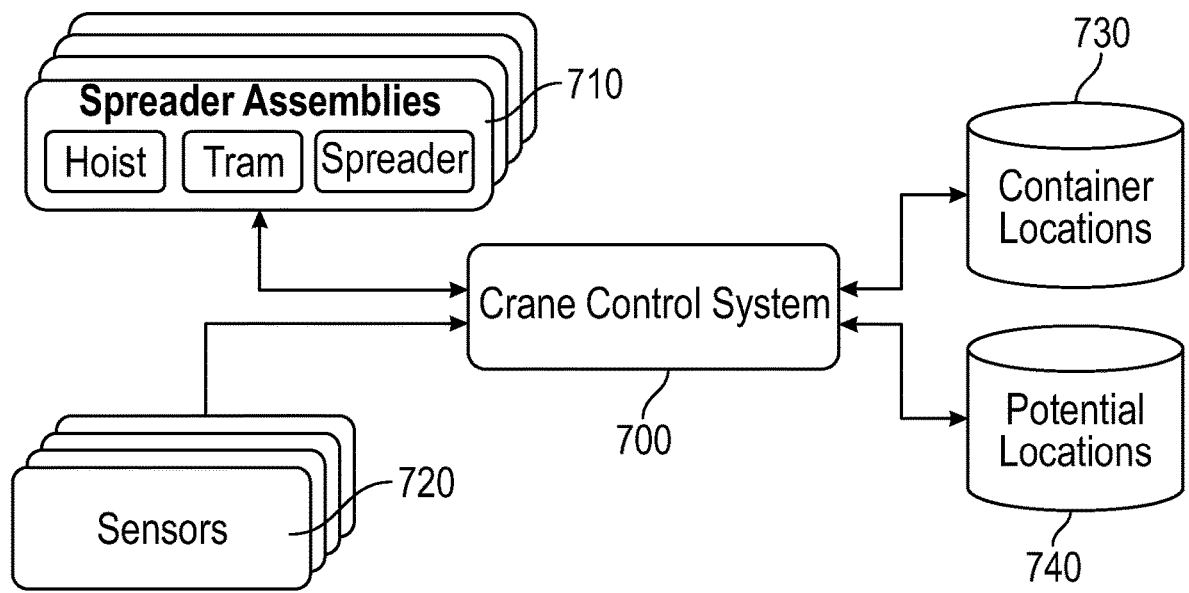
FIG. 7 depicts an example crane control system.

FIG. 7 depicts an example crane control system 700.

Referring to FIG. 7, in various embodiments, the crane control system 700 is configured to operate according to the location of containers 730 and the desired unloading locations 740. For example, the crane control system 700 is configured to autonomously unload a container ship in a fast and efficient manner. For example, the crane may be positioned over a plurality of trains. Each of the trains may have one or more cars configured to receive a shipping container. The crane control system may be configured to match containers with each of the trains' available cars based on the destination/route of the train and the location of the containers on a ship. The container locations and available unloading locations may be stored in a database or similar suitable data storage system.

In various embodiments, the crane control system 700 may control one or more spreader assemblies 710. The crane control system 700 may control the spreader assemblies 710 according to one or more sensors 720. The sensors 720 may be configured to identify the location of the spreader assemblies 710 or the containers 730. In some embodiments, the sensors 720 may be configured to identify the contents of a container. For example, the sensors 720 may be visual sensors that can identify the markings on the side of a container. In another example, the sensors 720 may be electronic sensors that can receive electronic communications to identify the container. In various embodiments, the sensors 720 may be located on the spreader assemblies 710 or may be located on other components of the crane system.

Figure 8:
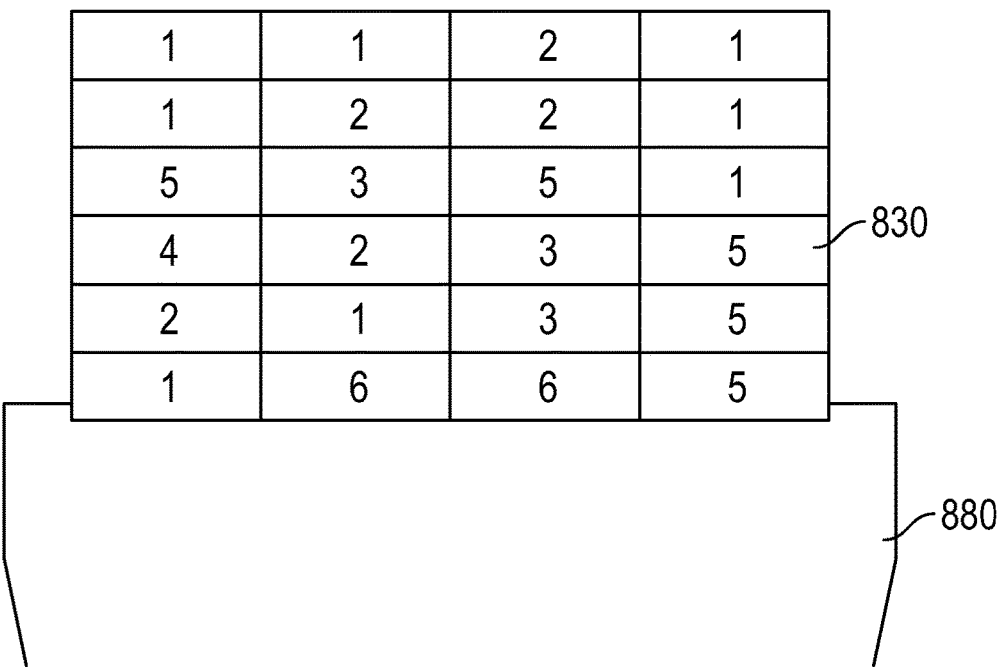
FIG. 8 depicts an example arrangement of containers on a ship.

FIG. 8 depicts an example arrangement of containers 830 on a ship 880.

In the example disclosed in FIG. 8, the control system has matched various containers 830 to a destination train. For example, in this example, the containers 830 have each been matched to one of six trains. The controller is configured to unload the containers 830 designated for the first train to the first train, containers 830 designated for the second train to the second train, and so on. Each of the spreader assemblies may be individually controlled by the controller according to one or more sensors. The sensors may be configured to identify the location of the spreader assemblies and the containers, and may also be configured to identify the contents of a container 830. For example, the spreader assemblies may include visual sensors to identify the markings on the side of a container 830, or electronic sensors for receiving an electronic communication to identify the container. In some embodiments, the control system may be configured to utilize a plurality of sensors to identify a container 830 and verify its identity. For example, the controller may be configured to receive identification information from three different sources before unloading a container 830 from a ship. In various embodiments, the sensors may be located on the spreader assemblies or may be located on other components of the crane system.

In various embodiments, the controller is further configured to control the operation of each of the spreader assemblies. For example, the controller may control the tram assembly units for each spreader assembly, the hoist system, or the spreader's ability to attach to a shipping container.

In various embodiments, once the spreader assemblies have identified a container 830 and the desired location, the spreader assemblies may work in conjunction with each other to unload the ship. For example, when trains 1-4 are currently within reach of the crane, the system may prioritize unloading the containers 830 associated with those trains (e.g., bound for a destination along the planned route of the train) and, when necessary, put containers 830 not associated with the currently available trains (e.g., trains 5 and 6) into the surge holding area. For example, in the depicted example, several of the "5" containers 830 are blocking containers 830 for trains 1-4 and therefore need to be unloaded.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Moreover, the drawings are not necessarily to scale.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A crane system comprising:
   an elevated track spanning a first location to a second location, and over a plurality of train tracks, wherein the elevated track comprises an elevated outer track and a plurality of elevated inner tracks, and wherein the elevated outer track is connected to the plurality of elevated inner tracks by a plurality of track switches, wherein the plurality of train tracks are positioned adjacent to each other and are between the first location and the second location;
   at least one spreader assembly configured to move along the elevated outer track and the plurality of elevated inner tracks of the elevated track using a tram assembly unit, and to move a shipping container from a first storage area to a train on the plurality of train tracks, wherein the first storage area and the train are between the first location and the second location; and
   a controller configured to:
   identify the shipping container, a location of the first storage area, an availability of a car on a train, and a destination of the train;
   match the shipping container with the car based on an identify of the shipping container, the location of the first storage area, the availability of the car, and the destination of the train; and
   control the crane system to move the shipping container from the first storage area to the car in response to the matching of the shipping container with the car using the at least one spreader assembly.

2. The system of claim 1, wherein the elevated outer track comprises an oval-shaped track.

3. The system of claim 1, wherein the first location corresponds to a ship and the second location corresponds to a container surge area.

4. The system of claim 3, wherein the first storage area comprises a ship.

5. The system of claim 3, wherein the first storage area comprises the container surge area.

6. The system of claim 1, wherein the controller is configured to identify the shipping container using at least one sensor and automatically place the shipping container on the car.

7. The system of claim 1, wherein each of the at least one spreader assembly comprises:
   a tram assembly unit comprising:
      a drive unit;
      at least one drive wheel;
      and at least one idler;
   a hoist unit; and
   a spreader.

8. The system of claim 7, wherein the system further comprises four tram assembly units.

9. The system of claim 7, wherein the tram assembly unit further comprises:
   two drive wheels; and
   four idlers.

10. The system of claim 7, wherein the hoist unit further comprises:
    a hoist motor;
    a hoist cable; and
    a control cable.

11. The system of claim 7, wherein the system further comprises a swivel configured to connect the tram assembly unit to the hoist unit.

12. A crane system comprising:
    an elevated track spanning a first location to a second location and comprising an elevated outer track and a plurality of elevated inner tracks, wherein the elevated outer track is connected to the plurality of elevated inner tracks by a plurality of track switches;
    at least one spreader assembly configured to move along the elevated outer track and the plurality of elevated inner tracks of the elevated track using a tram assembly unit, and to move a shipping container between a first storage area and a second storage area, wherein the first storage area and the second storage area are between the first location and the second location, wherein each of the at least one spreader assembly comprises:
    a tram assembly unit comprising:
       a drive unit;
       at least one drive wheel;
       and at least one idler;
    a hoist unit;
    a plurality of swiveling joints configured to connect the tram assembly unit to the hoist unit;
    a spreader connected to the hoist unit by at least one cable, wherein the plurality of swiveling joints are configured to allow the spreader to pivot with the tram assembly unit and the hoist unit along a curve of the elevated track; and a controller configured to identify the shipping container and control a movement of the shipping container using the at least one spreader assembly.

13. The system of claim 12, wherein the first storage area comprises a ship.

14. The system of claim 13, wherein the second storage area comprises a train.

15. The system of claim 13, wherein the second storage area comprises a container surge area.

16. The system of claim 12, wherein the at least one drive wheel is in contract with a bottom of an I-beam of the track.

17. The system of claim 16, wherein the at least one idler is in contact with a center of the I-beam of the track.

18. A method for loading and unloading a shipping container in a crane system comprising:

identifying, by a controller, a location of the shipping container at a first storage area;

retrieving, by the controller using a spreader assembly configured to travel along an elevated track comprising an elevated outer track and a plurality of elevated inner tracks, wherein the elevated outer track is connected to the plurality of elevated inner tracks by a plurality of track switches, the shipping container at the first storage area;

moving, by the controller using the spreader assembly, the shipping container from the first storage area to a second storage area; and storing, by the controller, the location of the shipping container at the second storage area, wherein the spreader assembly comprises:

a tram assembly unit comprising:
a drive unit;
at least one drive wheel;
and at least one idler;

a hoist unit;

a plurality of swiveling joints configured to connect the tram assembly unit to the hoist unit; and a spreader connected to the hoist unit by at least one cable, wherein the plurality of swiveling joints are configured to allow the spreader to pivot with the tram assembly unit and the hoist unit along a curve of the elevated track.

19. The method of claim 18, wherein the elevated outer track comprises an oval-shaped track.

20. The method of claim 18, wherein the first storage area comprises a ship.

21. The method of claim 20, wherein the second storage area comprises a train.

22. The method of claim 20, wherein the second storage area comprises a container surge area.

* * * * *